Patented Mar. 6, 1945

2,370,786

UNITED STATES PATENT OFFICE 2,370,786

SULPHONYL CHLORIDE DERIVATIVES AND PROCESSES OF PREPARING THE SAME

Arthur L. Fox, Woodstown, N. J., assignor to E. I. du Pont de Nemours & Company, Wilmington, Del., a corporation of Delaware No Drawing. Application August 27, 1940, Serial No. 354,596

3 Claims. (Cl. 260—461)

This invention relates to the production of saturated aliphatic and alicyclic esters of phosphorous and phosphoric acids containing at least one sulphonyl chloride group. More particularly, it relates to the production of such compounds by reacting saturated aliphatic or alicyclic phosphates and phosphites with admixed sulphur dioxide and chlorine under conditions which will introduce sulphonyl chloride groups into the hydrocarbon. The invention also relates to the production of sulphonic acids and their water-soluble salts and to new chemical compounds and mixtures.

This invention has for an object the production of new organic compounds.

The above and other objects are accomplished by the following invention which in its broader aspects comprises reacting a saturated aliphatic or alicyclic ester of a phosphorus acid with admixed sulphur dioxide and chlorine while irradiating the reaction zone with actinic light.

In one of its more limited aspects, the invention involves reacting esters of the above-mentioned type with admixed sulphur dioxide and chlorine while irradiating the reaction zone with light of wave lengths from under 1500 to 7000 Å. or over and preferably from 3000 to 5800 Å.

The molecular weight of the hydrocarbon residues of the initial reactants may vary widely; however, they should contain at least 4 carbon atoms.

In general, the reaction is continued until a material proportion of the ester reactant has had introduced into the hydrocarbon nucleus or radical thereof at least one sulphonyl chloride group. The reacted compounds may then be removed by decantation, solvent extraction, distillation, including steam distillation, vacuum distillation, etc. or a combination of such steps; or conversion to other compounds. Thus, extraction with $SO_2$ has been found effective. The distillation may be carried out at atmospheric pressure or under reduced or elevated pressure.

The temperature and pressure conditions are not critical but may be varied over a wide range. They may vary from −40° C. or lower, for instance, up to the decomposition point of the formed sulphonyl halides of the esters treated. Various proportions of reactants may be used. It is generally desirable to have at least one mol of sulphur dioxide per mol of chlorine but is not essential. Less chlorination occurs under these conditions.

The invention is intended to be illustrated but not limited by the following examples in which the parts given are parts by weight.

Example I

Fifty parts tri-normal butyl phosphate was treated with mixed sulphur dioxide and chlorine for 3½ hours in the presence of a 500 watt tungsten filament light. The mixture was maintained at such a ratio that the sulphur dioxide was twice that of the chlorine. The product stayed water white and heated up to 70° during the reaction. The product was aerated with nitrogen for 10 hours and at this point the net gain in weight was 10 parts.

Analysis of the product:

|  | Per cent |
|---|---|
| Sulphur | 7.04 |
| Chlorine | 14.89 |
| Phosphorus | 9.26 |

The above analysis indicated that the product was composed mainly of a partially chlorinated normal butyl phosphate mono-sulphonyl chloride.

Example II

Fifty parts of tri-iso-amyl phosphite was treated with a gaseous mixture of sulphur dioxide and chlorine for 3 hours in the presence of a 500 watt tungsten filament light with a clear glass bulb as a catalyst. The sulphur dioxide flow was maintained at twice that of the chlorine flow. As soon as the gaseous reactants were introduced, the product turned from water white to yellow. After 10 minutes a foam had formed over the reaction mass and at 12 minutes the foam cleared, the temperature reaching 122° C. At 15 minutes the color changed to water white again and at 23 minutes it became yellow. The temperature gradually fell so that at 70 minutes it had reached 76°. The final product was light straw color, and on blowing 12 hours with nitrogen showed a gain in weight of 8 parts.

Analysis:

|  | Per cent |
|---|---|
| Sulphur | 3.61 |
| Chlorine | 15.3 |
| Phosphorus | 10 |

This analysis indicated that about 30% of the product contained sulphonyl chloride groups and that considerable chlorination also occurred.

The invention is not limited to the temperature and procedural conditions set forth above in the examples. On the contrary a wide range of temperature, pressure, proportions, and wave lengths of light may be resorted to. A ratio of 0.75 to 20 mols of sulphur dioxide to 1 mol of chlorine represents a practical range and 1.1 to 6 mols of $SO_2$ to 1 mol of chlorine a preferred range. The reaction may be carried out batchwise or continuously and the reactants may pass countercurrent or cocurrent. The procedural conditions and apparatus described in U. S. patents, 2,202,791 and 2,193,824 thus may be resorted to.

While each of the examples is directed to the use of sulphur dioxide and chlorine in the gaseous state, as previously indicated one or both of these reactants may be in the liquid state. Solvents or diluents such as carbon tetra chloride, ethylene dichloride, etc., may be added to maintain a proper reaction environment. Sulphur dioxide and bromine can be reacted in a similar manner.

Various sources of light may be utilized in irradiations of the reaction, e. g. direct sunlight, diffused daylight, ultra violet light, including incandescent lamps, clear, frosted or colored glass lamps, rare gas lamps, fluorescent lamps, mercury vapor lamps, carbon arcs, including metal cored and metal salt cored carbon arcs, etc. Light screens may be used which let certain wave lengths only irradiate the reaction zone. A quartz window or reaction vessel is quite practical.

The invention has the advantage that sulphonyl chloride derivatives of saturated aliphatic and alicyclic esters of phosphorus and phosphoric acids may be prepared without affecting the ester groups. A further advantage resides in the fact that such compounds may be prepared in an economical manner. Another advantage is that they can be prepared by a single reaction step. A further advantage is that they can be prepared from cheap and readily available reactants.

The products prepared according to this invention serve as intermediates for the preparation of numerous derivatives such as, for example, alicyclic sulphonic acids, sulphinic acids, amides, sulphonyl esters, mercaptans, etc. which may be useful as mercerizing assistants, plasticizers for paints, nitrocellulose lacquers, varnishes, Cellophane, etc., corrosion inhibitors, gum solvents for gasoline, extractants for the refining of oils and gasoline, pour point depressants, insecticides, fly spray ingredients, weed killers, soil fumigants, cotton immunization chemicals, anti-shrinking agents for wool, foaming agents, mold inhibitors, crease-proofing agents, viscose modifiers, pharmaceuticals, detergents, wetting agents, rewetting agents, for improving textile treating processes including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing pastes, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, cleansing compositions as household detergent compositions, shampoos, dentifrices, washing of paper mill felts, etc. They may also be used to improve fat liquoring and leather treatment processes as well as for fat splitting agents. They may be useful in improving the preservation of green fodder. They may also be useful in improving the removal of fibrous layers from surfaces and in metal cleaning. They may also be used to improve flotation processes of ores, pigments, coal, etc. They may be used in breaking petroleum emulsions or in different concentrations as emulsifying agents. They may also be useful in improving food preparations. They may be useful in improving the cooking of wood pulp. They may be used for reducing or preventing the development of static charges during the processing of filaments, yarns or textiles. They may also be useful in providing improved ceramic assistants and processes to improve the setting of cement. They may be useful in storage batteries and dry cells. Other uses for these products or their derivatives are as fungicides, accelerators, delusterants, extreme pressure lubricants, moth proofing agents, antiseptics, fire-proofing agents, mildew preventers, penetrating agents, anti-flexing agents, tanning agents, lathering agents, dust collecting agents, anti-oxident, color stabilizer in gasoline, etc.

As many apparently widely different embodiments of this invention may be made without departing from the spirit and scope thereof, it is to be understood that I do not limit myself to the specific embodiments herein except as defined by the appended claims.

I claim:

1. A substituted alkyl phosphate of at least 4 carbon atoms containing at least one sulphonyl chloride group in the hydrocarbon nucleus thereof.

2. A substituted tri-normal butyl phosphate containing at least one sulphonyl chloride group in the hydrocarbon nucleus thereof.

3. The process which comprises reacting a saturated aliphatic hydrocarbon phosphate having at least 4 carbon atoms with admixed sulphur dioxide and chlorine in the proportion of 1.1 to 6 mols of the former per mol of the latter, in the presence of light of wave length from 3000 to 5800 Å., in the liquid phase at a temperature from −40° C. to the decomposition point of the formed organic sulphonyl chlorides, until at least one sulphonyl chloride group has been introduced into the hydrocarbon nucleus, and recovering a sulphonyl chloride derivative of said hydrocarbon phosphate.

ARTHUR L. FOX.